United States Patent
Wuerschig et al.

(10) Patent No.: US 11,719,672 B2
(45) Date of Patent: Aug. 8, 2023

(54) APPLICATION SPECIFIC EXCITATION OF ULTRASONIC PROBES

(71) Applicant: Baker Hughes Oilfield Operations LLC, Houston, TX (US)

(72) Inventors: Thomas Wuerschig, Cologne (DE); Johannes Buechler, Siegburg (DE)

(73) Assignee: Baker Hughes Oilfield Operations LLC

(*) Notice: Subject to any disclaimer, the term of this patent is extended or adjusted under 35 U.S.C. 154(b) by 172 days.

(21) Appl. No.: 17/308,003

(22) Filed: May 4, 2021

(65) Prior Publication Data

US 2021/0389278 A1 Dec. 16, 2021

Related U.S. Application Data

(60) Provisional application No. 63/038,382, filed on Jun. 12, 2020.

(51) Int. Cl.
*G01N 29/34* (2006.01)
*G01N 29/24* (2006.01)
(Continued)

(52) U.S. Cl.
CPC ............ *G01N 29/34* (2013.01); *G01N 29/24* (2013.01); *G01N 29/30* (2013.01); *G01N 29/341* (2013.01);
(Continued)

(58) Field of Classification Search
CPC ........ G01N 29/34; G01N 29/24; G01N 29/30; G01N 29/341; G01N 29/343;
(Continued)

(56) References Cited

U.S. PATENT DOCUMENTS

| 4,597,292 A | 7/1986 | Fujii et al. |
| 6,334,846 B1 | 1/2002 | Ishibashi et al. |

(Continued)

FOREIGN PATENT DOCUMENTS

| DE | 102005008490 B4 * | 2/2009 | ............... A61B 8/14 |
| JP | 2005237503 A * | 9/2005 | ............... A61B 8/14 |

(Continued)

OTHER PUBLICATIONS

Sonowall 50 Wallthickness Measurement Gage. Datasheet [online]. Sonotec Ultrasonic Solutions, 2019 [Retrieved on Oct. 23, 2019], Retrieved from the Internet: <URL: https://www.sonotec.eu/products/non-destructive-testing/wall-thickness-measurement/sonowall-50/>.

(Continued)

*Primary Examiner* — Lisa M Caputo
*Assistant Examiner* — Rose M Miller
(74) *Attorney, Agent, or Firm* — Mintz Levin Cohn Ferris Glovsky and Popeo, PC

(57) ABSTRACT

Systems and methods for improved ultrasonic testing are provided. An ultrasonic testing system can include an ultrasonic probe and an ultrasonic controller in electrical communication with the ultrasonic probe. The ultrasonic probe can include a plurality of ultrasonic transducers. The ultrasonic controller can be configured to generate one or more driving signals operative to cause the plurality of ultrasonic transducers to generate respective ultrasonic waves. A combination of the ultrasonic waves can form an ultrasonic waveform having one or more characteristics specified by the one or more driving signals. The ultrasonic controller can be further configured to change the one or more driving signals to adjust at least one characteristic of the ultrasonic waveform.

14 Claims, 12 Drawing Sheets

(51) Int. Cl.
*G01N 29/30* (2006.01)
*G01N 29/06* (2006.01)
*G01N 29/40* (2006.01)
*G01N 29/42* (2006.01)
*G01N 29/38* (2006.01)
*G01N 29/04* (2006.01)

(52) U.S. Cl.
CPC ......... *G01N 29/343* (2013.01); *G01N 29/348* (2013.01); *G01N 29/38* (2013.01); *G01N 29/40* (2013.01); *G01N 29/42* (2013.01); *G01N 29/043* (2013.01); *G01N 29/0654* (2013.01)

(58) Field of Classification Search
CPC ...... G01N 29/348; G01N 29/38; G01N 29/40; G01N 29/42; G01N 29/43; G01N 29/0654
See application file for complete search history.

(56) References Cited

U.S. PATENT DOCUMENTS 6,899,679 B2 * 5/2005 Kawagishi .......... G01S 15/8954
600/443
9,500,627 B2 11/2016 Fetzer et al.
9,689,974 B2 * 6/2017 Someda ............. G01S 7/52049
2004/0162509 A1 8/2004 Sakurai et al.
2006/0293595 A1 * 12/2006 Clark .................... G01S 7/5202
600/437

FOREIGN PATENT DOCUMENTS

| JP | 2006247061 A | * | 9/2006 | ............... A61B 8/00 |
| KR | 1019990002998 A | | 1/1999 | |
| KR | 1020100057341 A | | 5/2010 | |
| KR | 1020180027274 A | | 3/2018 | |
| WO | 2009121903 A1 | | 10/2009 | |
| WO | WO-2015150810 A1 | * | 10/2015 | ............. A61B 8/481 |

OTHER PUBLICATIONS

Ritter, J. "Universal Phased Array UT Probe for Nondestructive Examinations using Composite Crystal Technology." NDTnet, Dec. 1996, vol. 1, No. 12, 9 pages.

Schelhorn, Robert L. "A Universal Probing Technique for Continuity and Isolation Testing of Thick-Film Multilayer Circuits." Proceedings of the 1979 International Microelectronics Symposium, Nov. 13-15, 1979, 9 pages.

International Search Report and Written Opinion dated Sep. 17, 2021 for International Application No. PCT/US2021/033366, 8 pages.

* cited by examiner

APPLICATION SPECIFIC EXCITATION OF ULTRASONIC PROBES

CROSS-REFERENCE TO RELATED APPLICATIONS

This application claims the benefit of U.S. Provisional Patent Application No. 63/038,382, filed on Jun. 12, 2020, and entitled "Application Specific Excitation Of Ultrasonic Probes," the entirety of which is incorporated by reference.

BACKGROUND

In some instances, non-destructive testing (NDT) is a class of analytical techniques that can be used to inspect characteristics of a target, without causing damage, to ensure that the inspected characteristics satisfy required specifications. For this reason, NDT can be used in a number of industries such as aerospace, power generation, oil and gas transport or refining. NDT can be useful in industries that employ structures that are not easily removed from their surroundings (e.g., pipes or welds) or where failures would be catastrophic.

Ultrasonic testing is one type of NDT. Ultrasound is acoustic (sound) energy in the form of waves that have an intensity (strength) which varies in time at a frequency above the human hearing range. In ultrasonic testing, one or more ultrasonic waves can be directed towards a target in an initial pulse. As the ultrasonic waves contact and penetrate the target, they can reflect from features such as outer surfaces and interior defects (e.g., cracks, porosity, etc.). An ultrasonic sensor can acquire ultrasonic measurements, such as acoustic strength as a function of time, that include these reflected ultrasonic waves.

SUMMARY

Ultrasonic testing can be used for a wide range of materials. The acoustic properties of a test material can depend upon factors such as microscopic and macroscopic structure of the test material and/or changes in internal dynamics introduced during manufacturing processes. Thus, acoustic properties can vary significantly between different materials. As a consequence, the frequency and/or waveform of ultrasonic waves suitable for penetration into the volume of a given test material, and achievement of a desired resolution, can be different for different test materials. Often, an optimization between the ultrasonic test frequency and the ultrasonic waveform can be employed.

In general, the ultrasonic frequency and/or ultrasonic waveform emitted by an ultrasonic probe is fixed and cannot be changed. This is because the piezoelectric crystals that generate the ultrasonic waves are driven at a predetermined modulation that is tailored to the resonance frequency of the piezoelectric crystals. As a result, existing ultrasonic testing systems employ probes that are designed for evaluation of a specific test material.

Unfortunately, due to the variation in acoustic properties of materials encountered on-site, many different types of ultrasonic probes can be required in order to accommodate these variations. The use of many ultrasonic probes can increase the cost of ultrasonic testing, as well as complexity to handle these different ultrasonic probes. Furthermore, in some cases, the acoustic properties of a test material can be unknown in advance, leading to uncertainty regarding the ultrasonic probe(s) suitable for evaluation of such test materials. Thus, it is possible that non-optimal ultrasonic probes are employed for ultrasonic testing, leading to reduced ultrasonic resolution and/or time delays.

Accordingly, embodiments of the present disclosure present ultrasonic testing systems and corresponding methods that provide a universal, high bandwidth ultrasonic probe. The ultrasonic probe is driven by electronics that allow precise modulation of emitted ultrasonic waves. Providing high bandwidth allows the ultrasonic testing system to provide coverage of a broad range of ultrasonic frequencies relevant for ultrasonic testing. The electronics can be further configured to drive the ultrasonic probe to generate ultrasonic waveforms of different frequencies, amplitudes, and durations. As an example, the ultrasonic waveforms can be derived from mathematical concepts or models (e.g., theoretical or phenomenological models). As a result, a single ultrasonic probe can provide application-specific ultrasonic waveforms, avoiding the need for use of multiple ultrasonic probes that are only capable of generating fixed ultrasonic waves.

In an embodiment, a system is provided and can include an ultrasonic probe and an ultrasonic controller. The ultrasonic probe can include a plurality of ultrasonic transducers. The ultrasonic controller can include one or more processors and it can be in electrical communication with the ultrasonic probe. The ultrasonic controller can be configured to generate one or more driving signals operative to cause the plurality of ultrasonic transducers to generate respective ultrasonic waves. A combination of ultrasonic waves can be an ultrasonic waveform having one or more characteristics specified by the one or more driving signals. The ultrasonic controller can be further configured to change the one or more driving signals to adjust at least one characteristic of the ultrasonic waveform.

In another embodiment, the controller can be configured to change the one or more driving signals to adjust at least one characteristic of the ultrasonic waveform during an ultrasonic inspection.

In another embodiment, the at least one characteristic can be an amplitude of the ultrasonic waveform.

In another embodiment, the at least one characteristic can be a time duration of the ultrasonic waveform.

In another embodiment, the at least one characteristic can be a center frequency of the ultrasonic waveform.

In another embodiment, the at least one characteristic can be a number of cycles of the ultrasonic waveform.

In another embodiment, the at least one characteristic can be an amplitude and a duration of the ultrasonic waveform. The controller can be further configured to change the one or more driving signals to concurrently adjust the amplitude and duration of the ultrasonic waveform.

In another embodiment, the at least one characteristic can be an amplitude and a frequency of the ultrasonic waveform. The controller can be further configured to change the one or more driving signals to maintain a constant amplitude and vary the frequency over time.

In another embodiment, a method of non-destructive testing is provided. The method can include generating, by an ultrasonic controller, one or more first driving signals. The method can also include emitting, by the plurality of ultrasonic transducers, respective first ultrasonic waves in response to receipt of one or more first driving signals. A combination of the first ultrasonic waves can be a first ultrasonic waveform having one or more characteristics specified by the one or more first driving signals. The method can further include generating, by the ultrasonic controller, one or more second driving signals. The method can additionally include emitting, by the plurality of ultrasonic transducers, respective second ultrasonic waves in response to receipt of the one or more second driving signals. A combination of the second ultrasonic waves can be a second ultrasonic waveform having at least one characteristic that is adjusted with respect to the first ultrasonic waveform.

In another embodiment, the method can also include generating the first and second driving signals such that the first ultrasonic waveform transitions to the second ultrasonic waveform during an ultrasonic inspection.

In another embodiment, the at least one characteristic can be an amplitude.

In another embodiment, the at least one characteristic can be a time duration.

In another embodiment, the at least one characteristic can be a center frequency.

In another embodiment, the at least one characteristic can be an amplitude and a duration. The amplitude and duration of the second ultrasonic waveform can concurrently differ from the amplitude and duration of the first ultrasonic waveform.

In another embodiment, the at least one characteristic can be an amplitude and a frequency. The amplitude the first and second ultrasonic waveforms can be approximately the same and the frequency of the first and second ultrasonic waveforms can be different.

In another embodiment, the method can also include selecting the center frequency by emitting, by the plurality of ultrasonic transducers, the first ultrasonic waveform having a first center frequency. The method can further include receiving, by the plurality of ultrasonic transducers, a third ultrasonic waveform resulting from reflection of the first ultrasonic waveforms from a target. The method can additionally include measuring, by the ultrasonic controller, an amplitude of the third ultrasonic waveform. The method can further include emitting, by the plurality of ultrasonic transducers, the second ultrasonic waveform having a second center frequency. The method can also include receiving, by the plurality of ultrasonic transducers, a fourth ultrasonic waveform resulting from reflection of the second ultrasonic waveforms from the target. The method can further include measuring, by the ultrasonic controller, an amplitude of the fourth ultrasonic waveform. The method can additionally include selecting, by the ultrasonic controller, the center frequency as first center frequency when the amplitude of the third ultrasonic waveform is greater than the amplitude of the fourth ultrasonic waveform. The method can further include selecting, by the ultrasonic controller, the center frequency as second center frequency when the amplitude of the fourth ultrasonic waveform is greater than the amplitude of the third ultrasonic waveform.

In another embodiment, the method can also include receiving, by the plurality of ultrasonic transducers, a third ultrasonic waveform resulting from reflection of the first ultrasonic waveforms from a target. The method can further include generating the one or more second driving signals based upon the third ultrasonic waveform. At least a portion of the amplitude of the second ultrasonic waveform can be reduced as a function of time with respect to the first ultrasonic waveform.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Ultrasonic testing systems are commonly used for non-destructive testing of materials to identify defects. In general, the characteristics of the ultrasonic waves generated by ultrasonic testing devices (e.g., frequency, amplitude, etc.) are generally fixed by type of ultrasonic probe employed and cannot be changed. Because different ultrasonic characteristics can be suitable for different materials, it can be necessary to maintain multiple ultrasonic probes to permit effective testing of different materials. Accordingly, improved systems and methods for ultrasonic testing are provided. The improved ultrasonic testing system can include a high bandwidth ultrasonic probe and corresponding ultrasonic controller that allow precise modulation (e.g., adjustable amplitude and frequency) of emitted ultrasonic waves. As a result, such systems and methods employ a single ultrasonic probe that can generate ultrasonic waveforms that are customized for each application, avoiding the need for multiple ultrasonic probes.

Embodiments of the present disclosure are primarily discussed in the context of a reflection mode of operation, where incident ultrasonic signals are reflected from one or more reflectors within a target and the resultant return ultrasonic signal is measured. However, it can be understood that embodiments of the present disclosure can also be employed in a transmission mode of operation, where incident ultrasonic signals generated on one side of the target are transmitted through the target and measured on the opposite side of the target.

Figure 1:
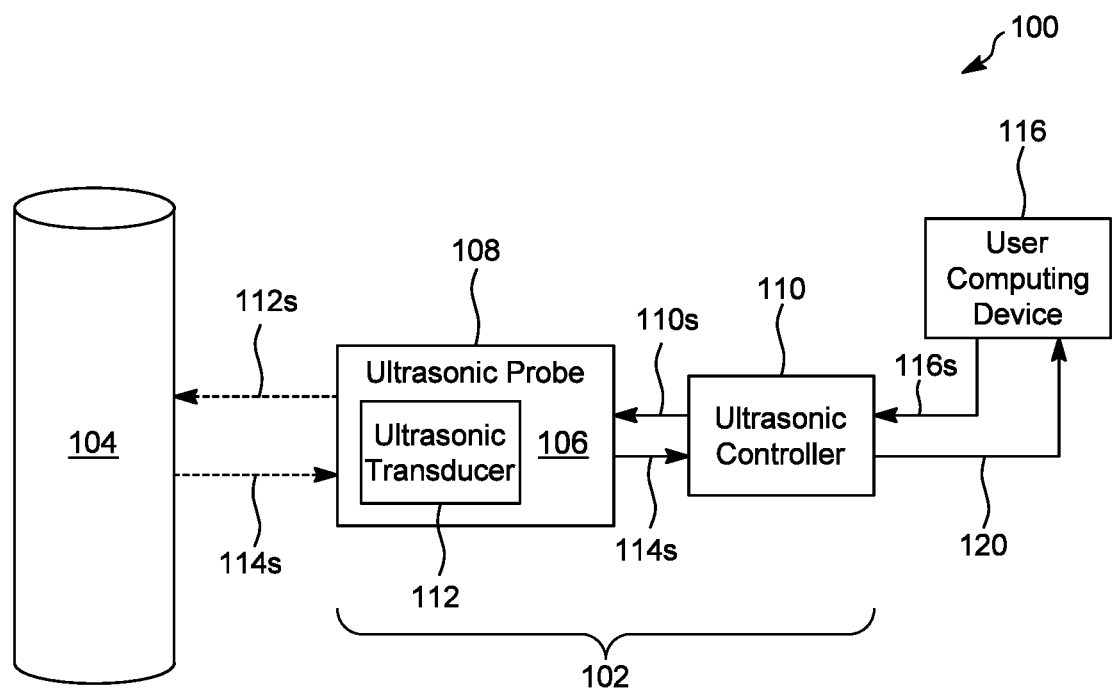
FIG. 1 is a diagram illustrating one exemplary embodiment of an operating environment including an ultrasonic testing system and a target.

FIG. 1 illustrates one exemplary embodiment of an operating environment 100 containing an ultrasonic testing system 102 and a target 104. The ultrasonic testing system 102 can include an ultrasonic probe 106, an ultrasonic controller 110, and a user computing device 116. The ultrasonic controller 110 is in signal communication with the ultrasonic probe 106 and the user computing device 116.

The ultrasonic probe 106 can include one or more ultrasonic transducers 112. The ultrasonic transducers 112 can be positioned within a housing 108 of the ultrasonic probe 106. The one or ultrasonic transducers 112 can each be configured to generate respective ultrasonic waves in response to one or more driving signals 110$s$ provided to the ultrasonic probe 106 by the ultrasonic controller 110. The combination of respective ultrasonic waves can be a waveform having predetermined characteristics, referred to herein as an incident ultrasonic signal 112$s$ or incident signal 112$s$. The ultrasonic transducers 112 can also be configured to detect ultrasonic waves reflected back to the ultrasonic sensor 106 from the target 104, referred to herein as return ultrasonic signals 114$s$ or return signals 114$s$.

In use, the ultrasonic probe 106 can be positioned proximate to the target 104 (e.g., in contact with or near the target 104) for measuring the return ultrasonic signals 114$s$. As discussed in greater detail below, a user can employ the user computing device 116 to specify the predetermined characteristics of incident signals 112$s$ (e.g., amplitude, frequency, duration, shape, etc.) to be generated by the ultrasonic transducers 112. These characteristics can be provided to the ultrasonic controller 110 in the form of command signals 116$s$ to the ultrasonic controller 110. In response to receipt of the command signals 116$s$, the ultrasonic controller 110 can generate corresponding driving signals 110$s$ operative to cause the ultrasonic transducers 112 to generate the incident signals 112$s$ with the selected characteristics. The ultrasonic transducers 112 can further receive the return ultrasonic signals 114$s$. The return ultrasonic signals 114$s$ can be output to the ultrasonic controller 110 for analysis to generate ultrasonic scans 120. The ultrasonic controller 110 can further output the ultrasonic scans 120 for storage and/or display by the user computing device 116.

So configured, the ultrasonic testing system 102 provides a variety of benefits. In one aspect, the characteristics of the incident signals 112$s$ can be selected based upon the acoustic properties of the target 104, facilitating penetration of the incident signals 112$s$ into the target 104 by a predetermined amount. In one aspect, the characteristics of the ultrasonic waveforms can be selected for short distance penetration, providing ultrasonic scans relatively close to the surface of the target 104. In another aspect, the characteristics of the ultrasonic waveforms can be selected for long distance penetration, providing ultrasonic scans within the bulk of the target 104. In either case, relatively high resolution images of a desired region of the target 104 can be obtained. In another aspect, the ability of the ultrasonic testing system 102 to tailor the incident signals 112$s$ to the acoustic properties of the target 104 allows the single ultrasonic probe 106 to replace multiple ultrasonic probes of different types. In this manner, ultrasonic testing can be performed with reduced cost and complexity.

Figure 2:
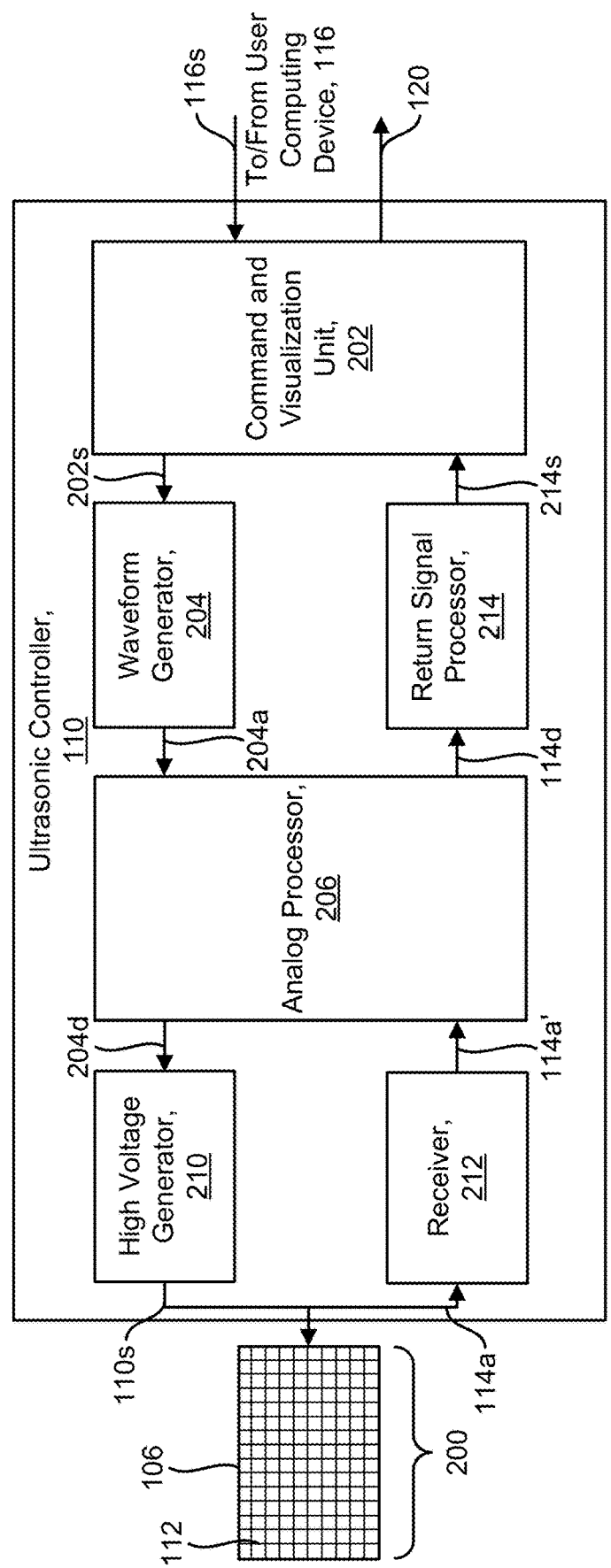
FIG. 2 is a diagram illustrating one exemplary embodiment of the ultrasonic testing system of FIG. 1, including an ultrasonic probe and an ultrasonic controller.

FIG. 2 is a schematic diagram illustrating the ultrasonic probe 106 and the ultrasonic controller 110 in greater detail. The ultrasonic probe 106 includes an array 200 (e.g., a rectangular array) of individual ultrasonic transducers 112.

In an embodiment, each ultrasonic transceiver 112 is a piezoelectric transceiver element. In alternative embodiments, other types of ultrasonic transceivers can be employed, such as electromagnetic acoustic transducers (EMATs) or capacitive micro-machined ultrasonic transducers (CMUTs) to enable the ultrasonic testing system 102 to function as described.

Each ultrasonic transducer 112 can be configured to transmit the incident signals 112$s$ and to receive the return ultrasonic signals 114$s$. As an example, the ultrasonic transducer 112 can be configured to generate ultrasonic waves resulting in incident signals 112$s$ having different one or more frequencies within the range from about 1 MHz to about 15 MHz. The shape of the incident signals 112$s$ predetermined shapes, also referred to herein as chirps. The incident signals 112$s$ can further exhibit precise modulation with high bandwidth.

As further shown in FIG. 2, the ultrasonic controller 110 includes a command and visualization unit 202, a waveform generator 204, an analog processor 206, a high voltage generator 210, a receiver 212, and a return signal processor 214. The command signals 116$s$ specifying the characteristics the incident signals 112$s$ can be output by the user computing device 116 and be received by the command and visualization unit 202. The command and visualization unit 202 can convert the command signals 116$s$ into instructions 202$s$ for receipt by the waveform generator 204. In response to receipt of the instructions 202$s$, the waveform generator 204 can generate corresponding analog excitation signals 204$a$ for each of the ultrasonic transducers 112. The analog processor 206 can convert the digital excitation signals 204$d$ into analog excitation signals 206$a$ for receipt by the high voltage generator 210. The high voltage generator 210 can include one or more amplifiers that are configured to amplify the analog excitation signals 206$a$ to generate the driving signals 110$s$ for receipt by the ultrasonic transducers 112.

The return signals 114$s$ received by the ultrasonic probe 106 can be converted into analog return signals 114$a$ by respective ones of the ultrasonic transducers 112. That is, at least a portion of the ultrasonic transducers 112 can output a respective analog return signal 114$a$ and these analog return signals 114$s$ can be directed to the receiver 212. The receiver 212 can include one or more amplifiers configured to amplify the analog return signals 114$a$ and output corresponding amplified analog return signals 114$a'$. The analog processor 206 can convert the amplified analog return signals 114$a'$ into digital return signals 114$d$ for receipt by the return signal processor 214.

The return signal processor 214 can be configured use the digital return signals 114$d$ in a summation process (e.g., a numerical construction) to generate ultrasonic scans (e.g., A-scans 214$s$) of the target 104. In an embodiment, the return signal processor 214 can include field-programmable gate arrays (FPGAs) to perform this summation. In alternative embodiments, the return signal processor can include application-specific integrated circuits (ASICs) for performing this summation.

The generated A-scans 214$s$ can be output to the command and visualization unit 202 for further processing. In general, the A-scans 214$s$ form a raw virtual image of the target 104. In one aspect, the command and visualization unit 202 can be configured to process the A-scans 214$s$ to remove noise by optimizing echoes created by features within the target 104 that might serve as reflectors of the ultrasonic signals 212$s$. These reflectors can represent flaws within the target 104.

In another aspect, the command and visualization unit 202 can be configured to perform ultrasonic test evaluations on the A-scans 214s. Each A-scan 214s represents a plurality of reflections of the incident signals 112s taken at predetermined time intervals and positions about the target 104. Accordingly, the A-scans 214s can be employed to generate a three-dimensional ultrasonic "field" of the target 104. After processing the A-scans 214s, ultrasonic scans 120 can be output from the command and visualization unit 202 to the user computing device 116 for storage and/or display.

In one aspect, the command and visualization unit 202 can correlate data acquired during ultrasonic testing with positions on the target 104. As an example, the ultrasonic testing system 102 can include a plurality of position encoders (not shown) coupled to the array 200 and in electrical communication with the command and visualization unit 202. The position encoders can record and output the position of the array 200 relative to the target 104. Analysis of the ultrasonic field by the command and visualization unit 202 can include selection of a segment or "slice" in time (also referred to as a "gate"). The gate can be analyzed to determine the largest sound wave amplitude within the gate, and a measured time in flight associated with that amplitude. "Time in flight" can refer to the amount of time required for a sound wave to travel through the target. The selected amplitude can be compared to predetermined reference amplitude, and the measured time of flight can be compared to a predetermined reference time of flight. If the selected amplitude exceeds the value of the reference amplitude, then a defect is deemed to be present at a physical location within the target that is associated with the selected gate. For example, a measured time of flight associated with a selected gate that registers below the predefined reference time of flight, may be indicative that the strength of the material in the target 104, at the associated location may be too low, as may be associated with internal corrosion at that location. Alternatively, for situations in which corrosion is present on an external surface of target 104, the measured time of flight may be greater than the predetermined reference time of flight.

Examples of different possible modulations of the incident signals 112s are discussed in detail below with regards to FIGS. 3A-3C, 4A-4C, 5A-5D, and 6. As discussed above, characteristics of the incident signal 112s can be varied by changing the driving signals 110s. The characteristics of the incident signal 112s can be selected based upon the acoustic properties of the target 104 in order to provide improved resolution (e.g., penetration) and avoid the need for multiple ultrasonic probes, reducing the cost to perform ultrasonic testing. While the examples of 3A-3C, 4A-4C, 5A-5D, and 6 illustrate specific types of changes in the characteristics of different incident signals 112s, it can be understood that the direction (e.g., increasing or decreasing) and magnitude of such changes can be adjusted by any desired amount.

Figure 3C:
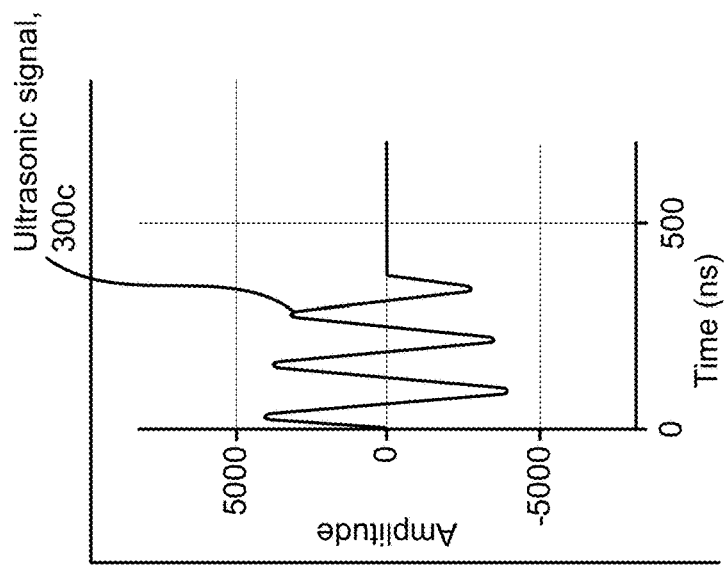
FIGS. 3A-3C are plots illustrating modulation of the amplitude of an incident ultrasonic signal generated by the ultrasonic testing system of FIG. 1.
Figure 3B:
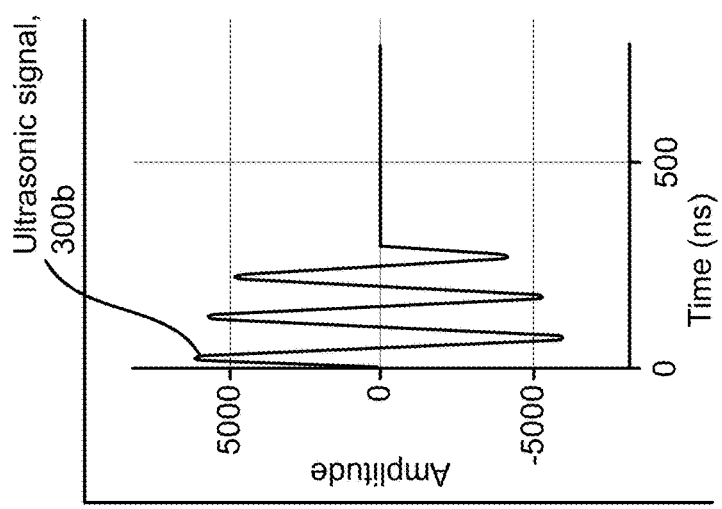
Figure 3A:
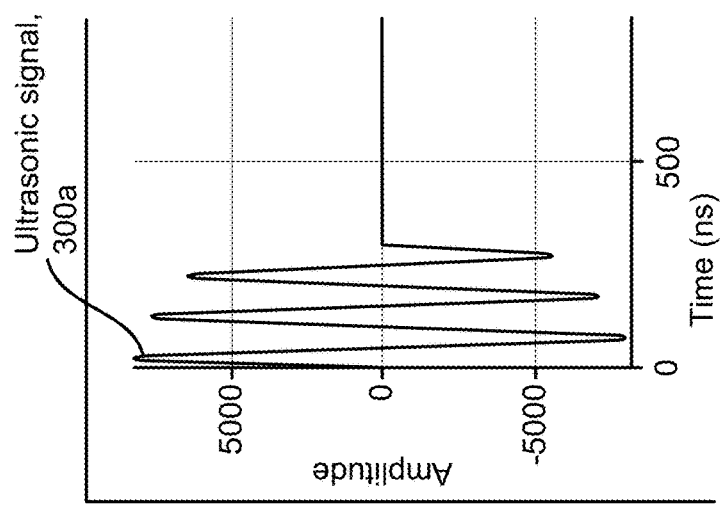

FIGS. 3A-3C are plots of ultrasonic amplitude as a function of time illustrating incident signals 112s in the form of ultrasonic signals 300a, 300b, and 300c. As shown, the amplitude and/or time duration of the ultrasonic signals 300a-300c can be changed by changing the driving signals 110s provided to the ultrasonic transducers 112. In one example, with reference to FIGS. 3A-3B, amplitude can be changed, decreasing from that of ultrasonic signal 300a to ultrasonic signal 300b, while the duration is kept constant. In another example, with reference to FIGS. 3B-3C, amplitude and the time duration can be changed concurrently while frequency is kept constant. As shown, amplitude decreases and time duration increases from ultrasonic signal 300b to ultrasonic signal 300c.

Figure 4A:
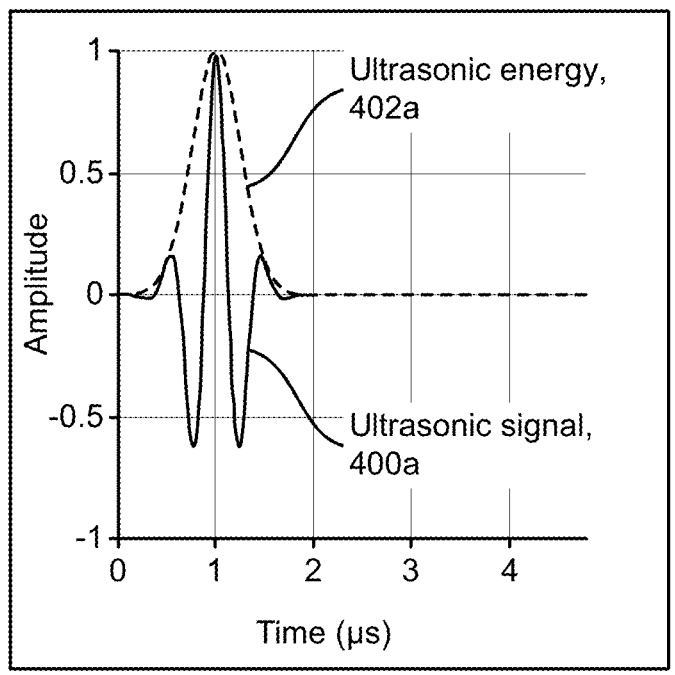
FIGS. 4A-4C are plots illustrating modulation of the duration of the incident ultrasonic signal generated by the ultrasonic testing system of FIG. 1.
Figure 4B:
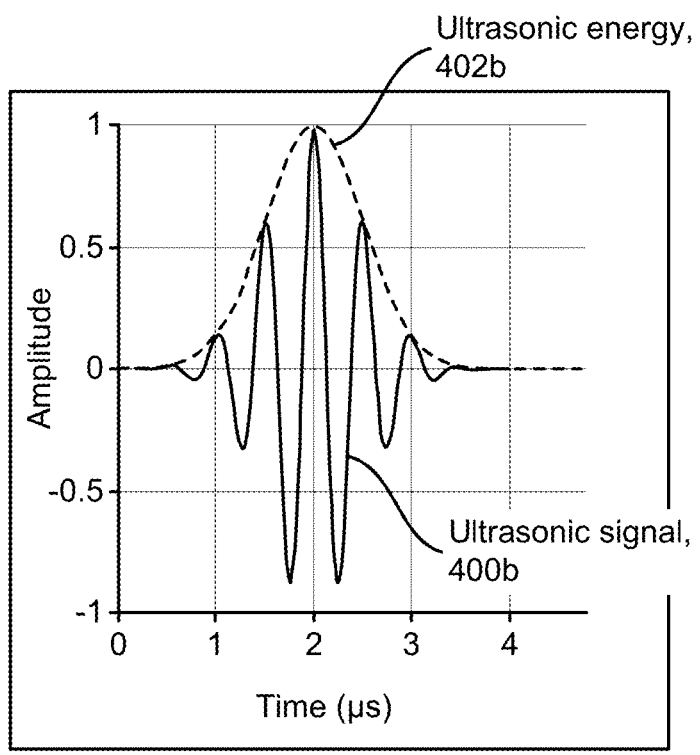
Figure 4C:
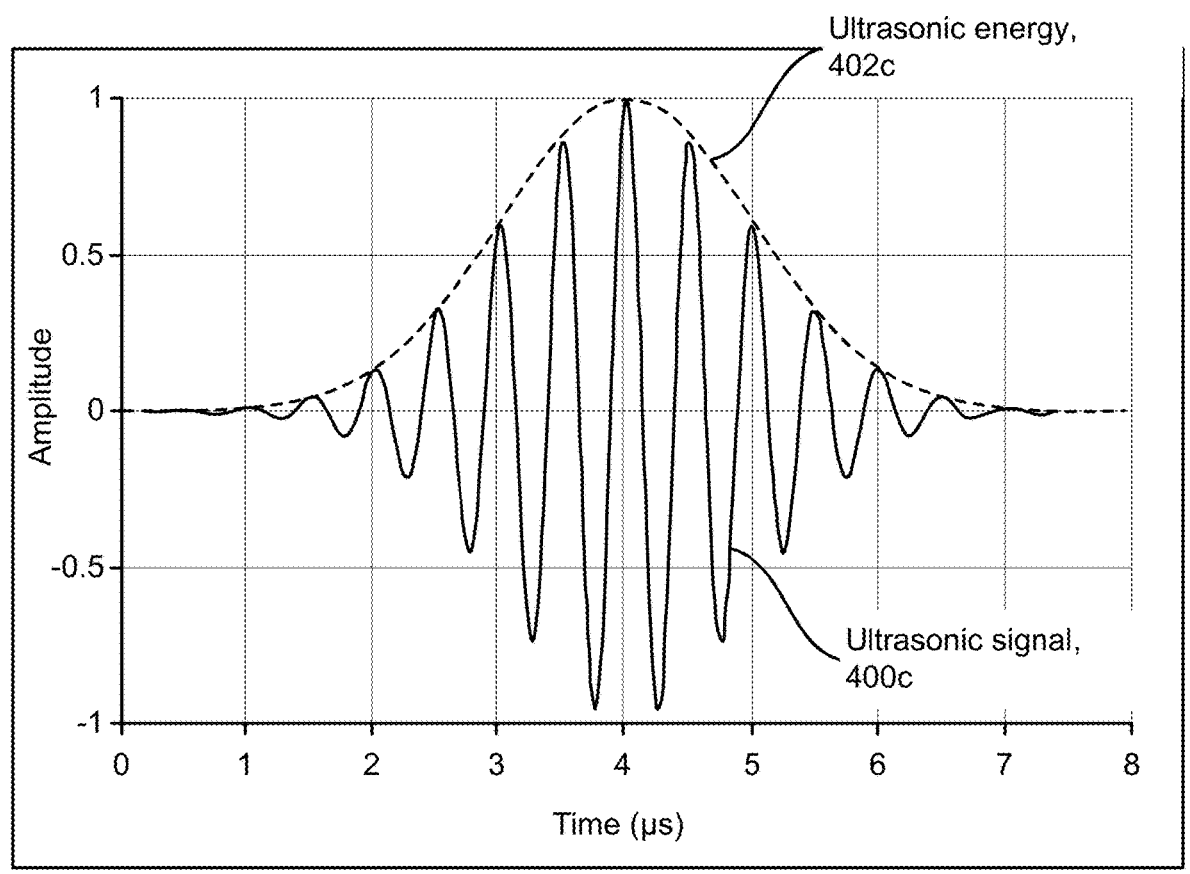
Figure 5A:
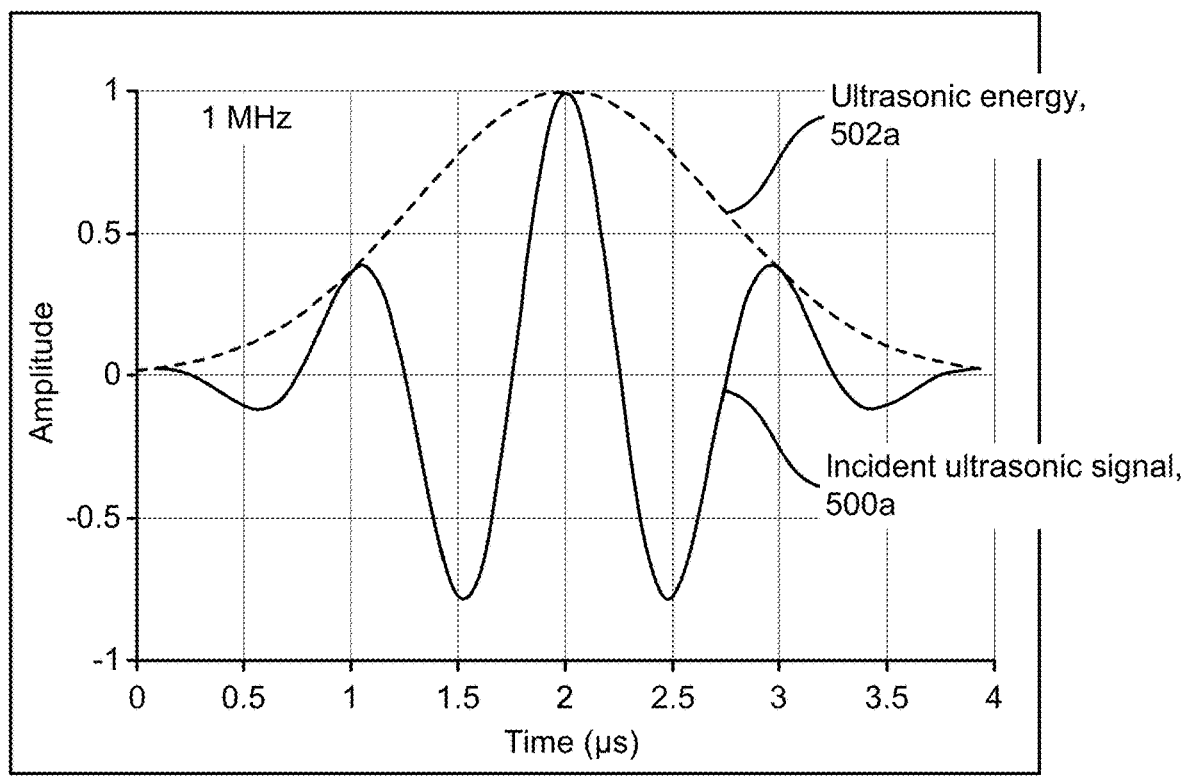
FIGS. 5A-5D are plots illustrating modulation of a center frequency of the incident ultrasonic signal generated by the ultrasonic testing system of FIG. 1.
Figure 5B:
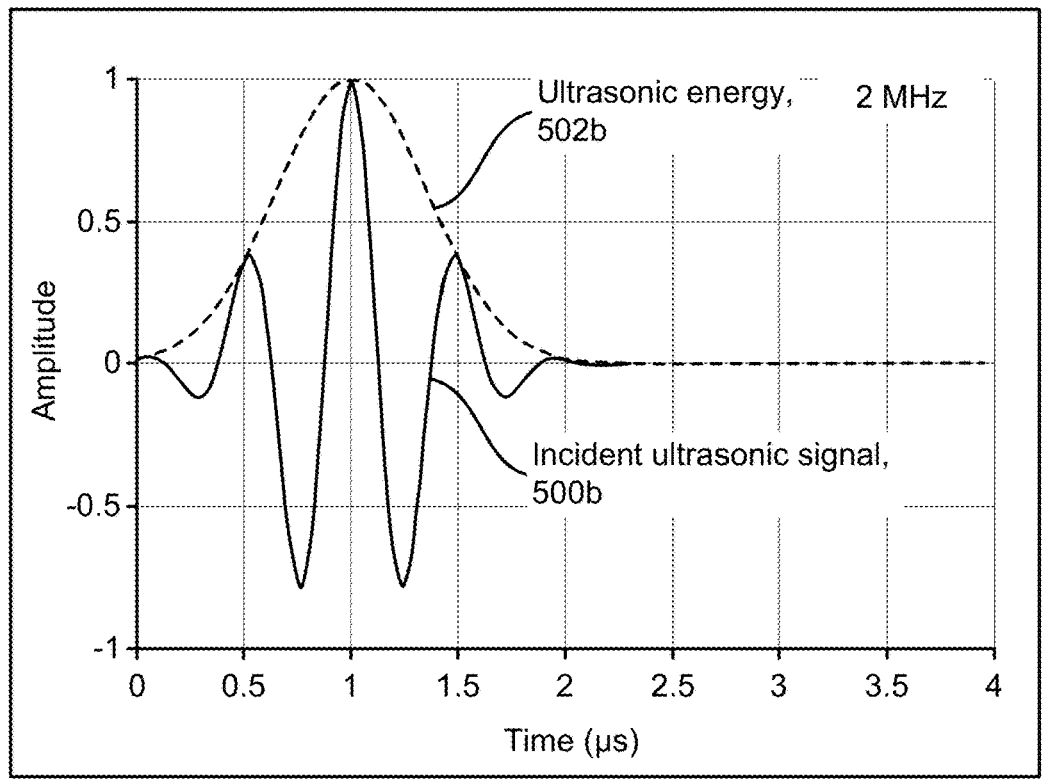
Figure 5C:
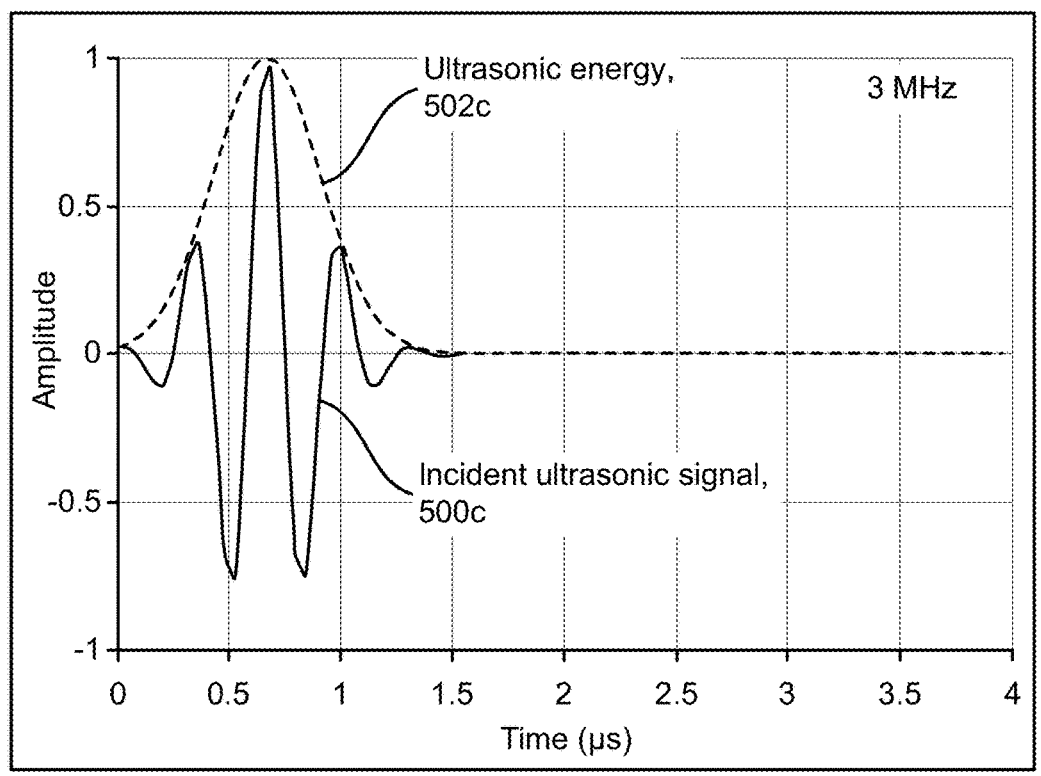
Figure 5D:
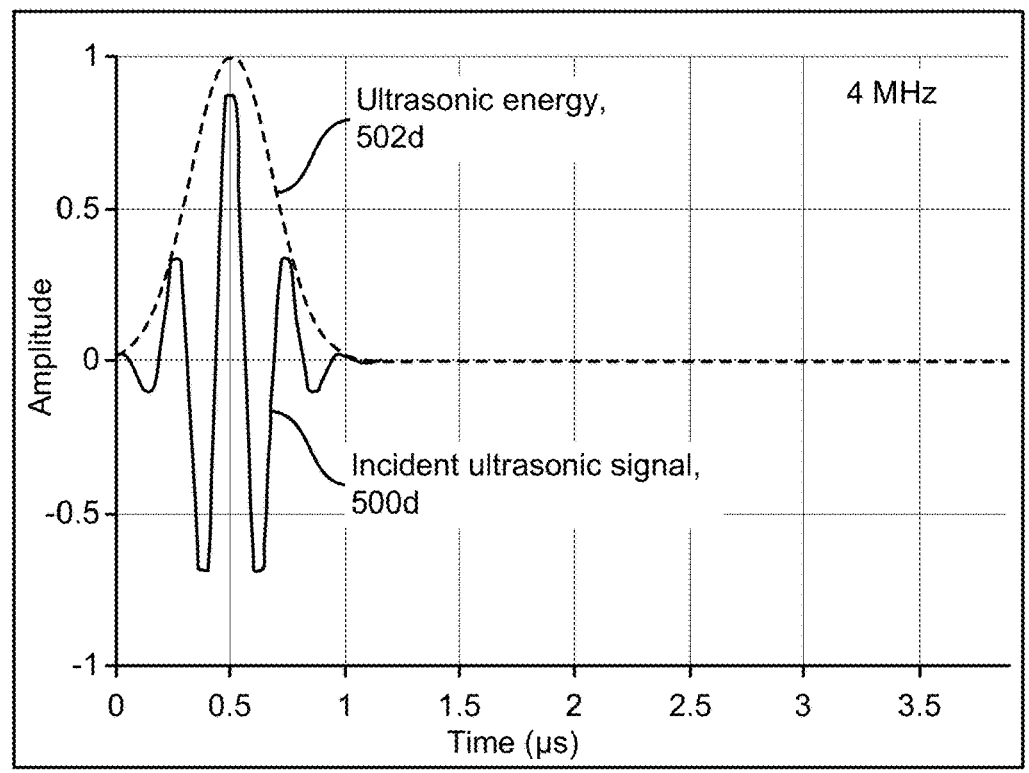

FIGS. 4A-4C are plots of ultrasonic amplitude as a function of time illustrating incident signals 112s in the form of ultrasonic signals 400a, 400b, and 400c. As shown, the duration of the ultrasonic signals 400a, 400b, and 400c can be changed by changing the driving signals 110s provided to the ultrasonic transducers 112. In one example, the time duration is increased from ultrasonic signal 400a to ultrasonic signal 400b to ultrasonic signal 400c, while the amplitude and frequency are held constant. The penetrating beam energy corresponding to each of the ultrasonic signals 400a, 400b, 400c is also overlaid on FIGS. 4A-4C. It can be observed that, by increasing the time duration while keeping the frequency and amplitude constant, the penetrating beam energy increases.

FIGS. 5A-5D are plots of ultrasonic amplitude as a function of time illustrating incident signals 112s in the form of ultrasonic signals 500a, 500b, 500c, and 500d. As shown, the center frequency of the ultrasonic signals 500a, 500b, 500c, and 500d can be changed by changing the driving signals 110s provided to the ultrasonic transducers 112. In one example, the center frequency is increased from 1 MHz, to 2 MHz, to 3 MHz, to 4 MHz, respectively between ultrasonic signal 400b to ultrasonic signal 400d, while the amplitude is held constant. The penetrating beam energy corresponding to each of the ultrasonic signals 500a, 500b, 500c is also overlaid on FIGS. 5A-5D. It can be observed that, by increasing the center frequency while keeping the amplitude constant, the penetrating beam energy decreases.

Figure 6:
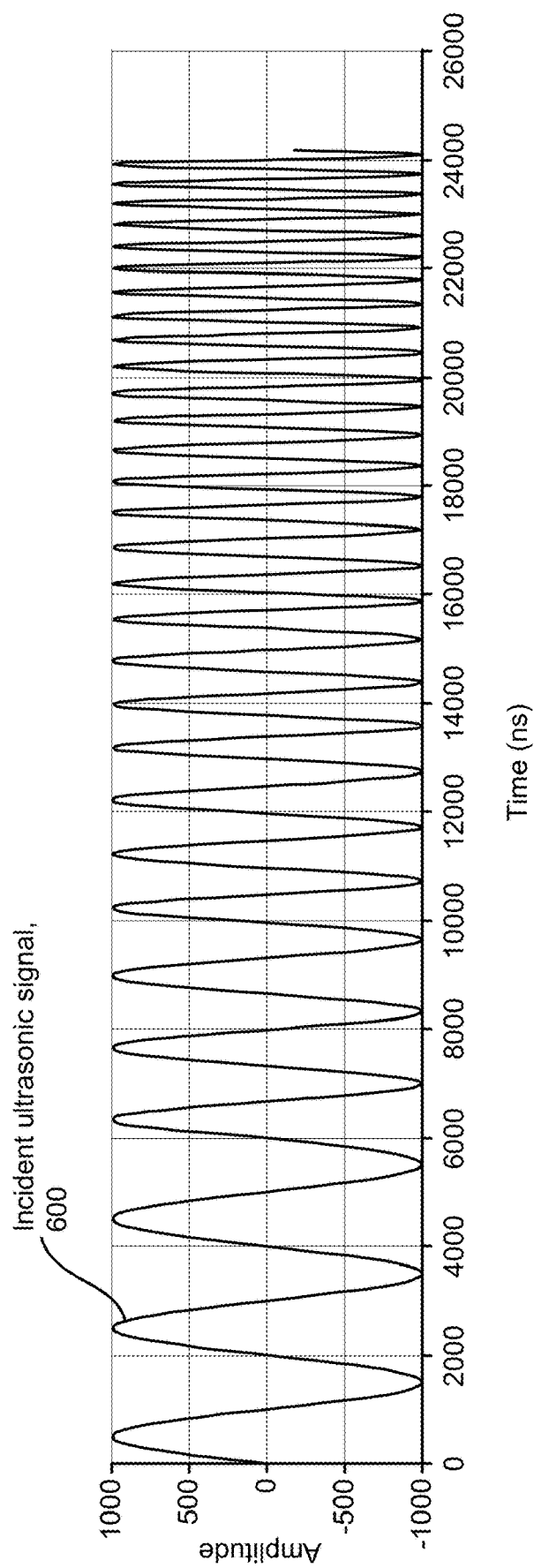
FIG. 6 is a plot illustrating modulation of the frequency of the incident ultrasonic signal generated by the ultrasonic testing system of FIG. 1 over time.

FIG. 6 is a plot of ultrasonic amplitude as a function of time illustrating incident signal 112s in the form of ultrasonic signal 600. As shown, the amplitude of ultrasonic signal 600 can be held constant while the frequency changes over time.

As discussed above, the modulation of the ultrasonic signals 112s can be selected based upon application-specific requirements. Selected non-limiting embodiments are discussed in greater detail below.

EXAMPLE 1

Optimization of Center Frequency with Respect to the Target Material

In general, the ultrasonic signals 112s and the return signals 114s experience a decrease in amplitude as a function of distance through the target 104, referred to as attenuation. Attenuation is undesirable because, when moderate to severe, it can result in a decrease in the signal to noise ratio (SNR) of the return signals 114s, affecting the quality of generated ultrasonic images. Such reduction in quality can further worsen the probability of detection (POD) of defects.

Attenuation of ultrasound within a given material is frequency dependent. Thus, for a given material, there can be a range of "optimal" center frequencies that minimize attenuation. In order to reduce attenuation and achieve better POD and SNR, the center frequency of the ultrasonic signals 112s can be adjusted to a value within the optimal range for the material which the target 104 is formed.

Under some circumstances, however, the optimal center frequency for the target 104 can be unknown. Thus, in further embodiments, the ultrasonic testing system 102 can perform a spectrographic characterization of the target 104 by varying the center frequency over a designated range (e.g., a full frequency range of the ultrasonic probe 106), while keeping other factors constant, and measuring the amplitude of the return signals 114s. This characterization provides the attenuation response of the target 104 as a function of frequency, from which the optimal center frequency range can be identified for the material of the target 104. Subsequently, a center frequency within this range can be used for further ultrasonic testing and/or as a starting point for optimization of other characteristics of the ultrasonic signals 112s.

EXAMPLE 2

Optimization of Center Frequency with Respect to the Reflector Properties

Reflectors are objects within the target 104 that are detected in an ultrasonic test due to reflection of the ultrasonic signals 112s and detection of the return signals 114s. Examples of reflectors can include defects (e.g., cracks, voids, inhomogeneities in composition, etc.) boundaries (e.g., front-facing surface of the target 104, rear facing surface of the target 104, etc.) In general, reflectors can vary as size (dimensions) and shape, and the amplitude of the return signals 114s can depend on the center frequency of the ultrasonic signals 112s. Thus, for a given type of reflector, can be a range of "optimal" center frequencies that minimize attenuation. Similar to the discussion above, selection of a center frequency within this optimal range can reduce attenuation and achieve better POD and SNR of a target defect.

Under some circumstances, however, the optimal center frequency for a selected reflector can be unknown. Thus, in further embodiments, the ultrasonic testing system 102 can perform a spectrographic characterization of the target 104 containing the selected reflector. This characterization provides the attenuation response of the target 104 as a function of frequency, from which the optimal center frequency range for the reflector can be identified. Subsequently, a center frequency within this range can be used for further ultrasonic testing and/or as a starting point for optimization of other characteristics of the ultrasonic signals 112s.

EXAMPLE 3

Selection of Ultrasonic Signal Shape for Surface Scan

In general, the time at which the return signal 114s is detected (e.g., time of flight) is related to the depth of penetration of the ultrasonic signal 112s within the target 104. Return signals 114s measured at relatively short times characterize the volume of the target 104 near the surface of the target 104, while return signals 114s measured at relatively long times characterize the volume of the target 104 farther away from the surface of the target 104. However, when performing an ultrasonic scan, a portion of the ultrasonic signal 112s reflects from the surface of the target 104 facing the ultrasonic probe. The amplitude of the return signal 114s associated with surface reflection will decrease with time. However, if this surface return signal 114s persists for too long, it will overlap with near sub-surface return signals 114s associated with reflectors relatively close to the surface of the target 104. As a result, it can be difficult to accurately measure near sub-surface return signals 114s and detect near sub-surface reflectors.

Figure 7:
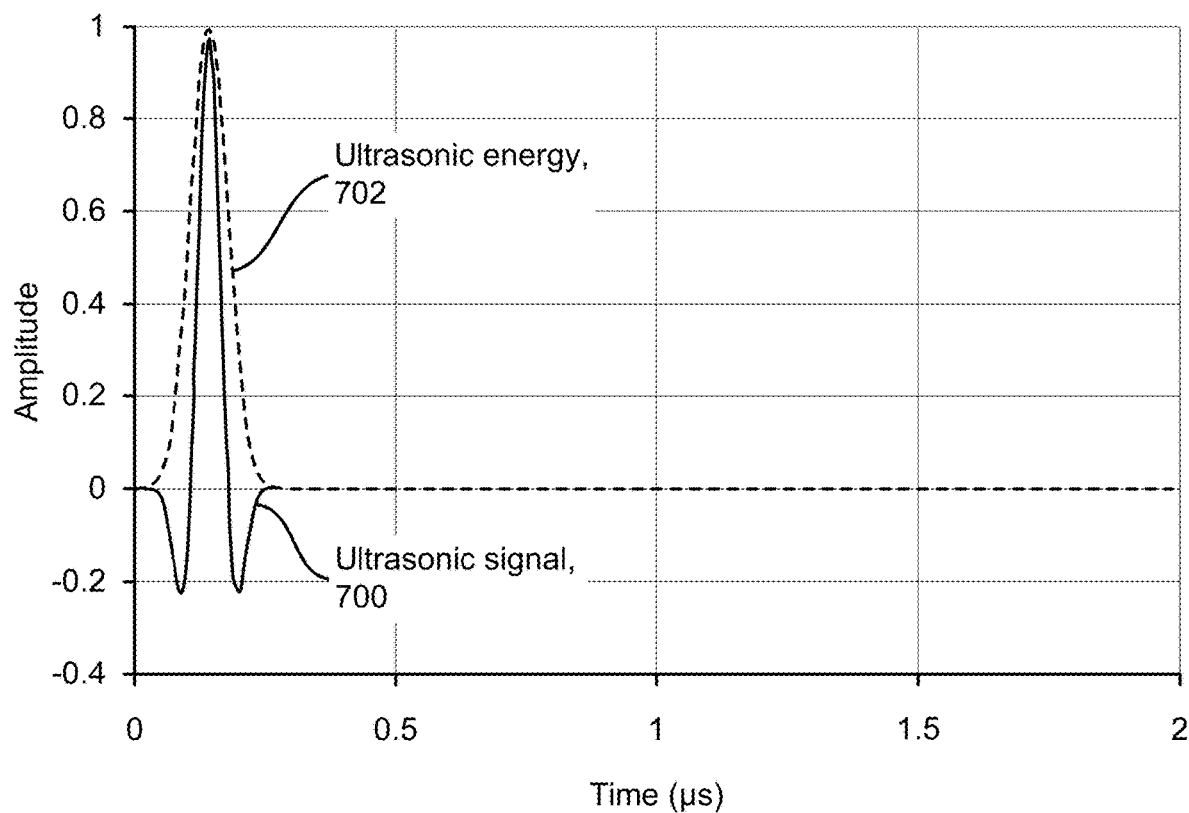
FIG. 7 is a plot illustrating one exemplary embodiment of a waveform generated by the ultrasonic testing system of FIG. 1 that provides enhanced resolution close to the surface of the target.

To avoid this problem, the shape of the ultrasonic signals 112s can be selected to reduce the time over which return signals 114s associated with surface reflection persist. An exemplary embodiment of such an ultrasonic signal 112s is shown in FIG. 7 as ultrasonic signal 700. The ultrasonic signal 700 can be relatively "sharp," with a relatively high frequency and low number of periods. As an example, the center frequency can be selected from the range of about 1 MHz to about 15 Hz. In general, it is desirable that the number of periods of the incident signal 112s is as small as possible. The specific center frequency and/or number of periods can be application-specific and adjusted in the field as necessary.

EXAMPLE 4

Active Suppression of Surface Return Ultrasonic Signals for Surface Scan

Embodiments of the ultrasonic testing system 102 can implement approaches other than that discussed above in Example 3 to facilitate near sub-surface characterization of the target 104. In general, the amplitude of the ultrasonic signals 112s generated by respective ultrasonic transducers 112 does not return to zero immediately after the driving signals 110s cease. Instead, there is a period of time during which the ultrasonic transducers 112 continue to oscillate, lengthening the time duration during which the amplitude of the ultrasonic signals 112s is significant, referred to as ringdown. As a result of ringdown, return ultrasonic signals 114s are also lengthened, which can be detrimental to characterization of near sub-surface defects as discussed above. Thus, it can be desirable to reduce ringdown to improve near sub-surface characterization of the target 104. In general, the response of each ultrasonic transducer 112 leading to ringdown is unique and can be measured prior to conducting an ultrasonic test. As an example, a probe test station can be employed to drive the ultrasonic probe using a Dirac (e.g., spike) pulse for a given probe certification.

Figure 8A:
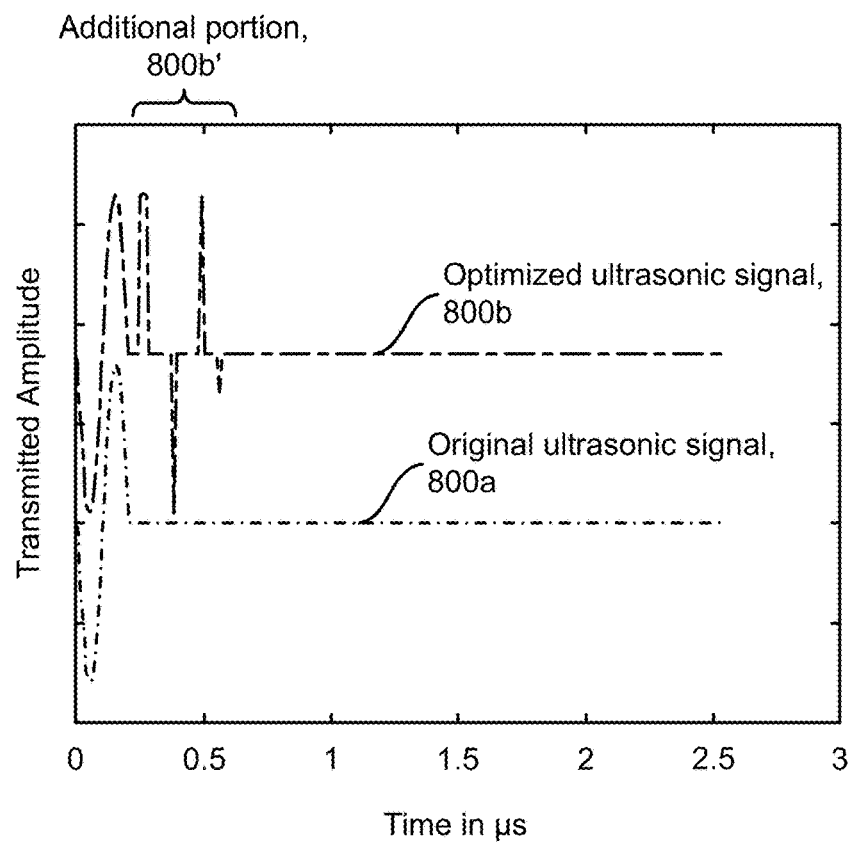
FIGS. 8A-8B are plots illustrating another exemplary embodiment of waveforms generated by the ultrasonic testing system of FIG. 1 that provide enhanced resolution close to the surface of the target.

The ultrasonic signal 112s can be modified based upon the measured response of the ultrasonic transducers to suppress ringdown. An example is illustrated in FIG. 8A, which shows an original ultrasonic signal 800a and an optimized ultrasonic signal 800b resulting from modification of the original ultrasonic signal 800a using the measured response of the ultrasonic transducers. It can be observed that the modified ultrasonic signal 800b includes an additional portion 800b' that is not present in the original ultrasonic signal 800a.

Figure 8B:
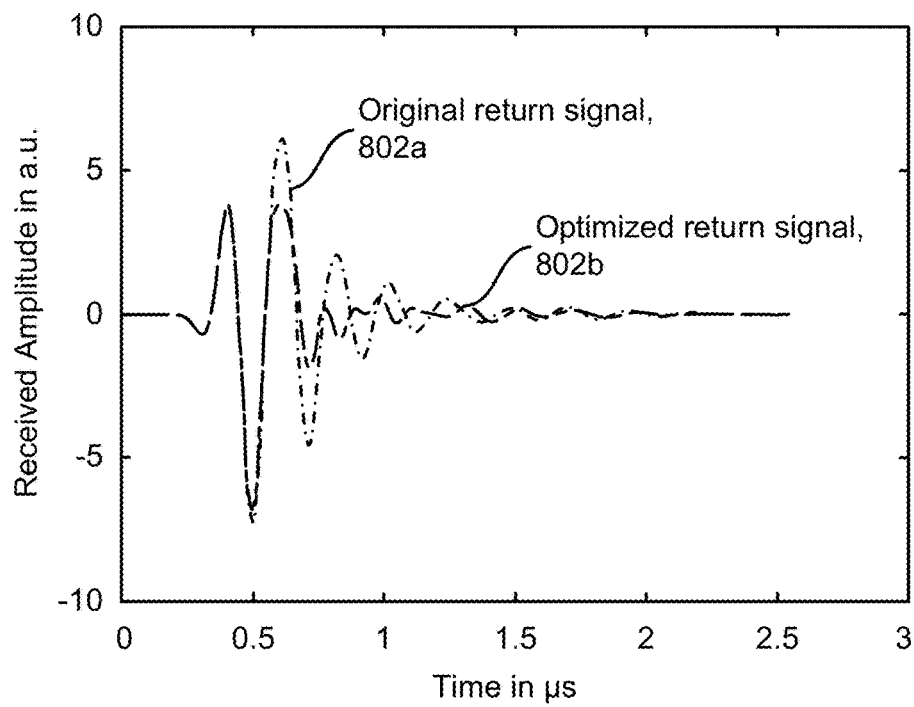

FIG. 8B illustrates an original return signal 802a resulting from surface reflection of the original ultrasonic signal 800a and an optimized return signal 802b resulting from surface reflection of the modified ultrasonic signal 800b. As an example, the additional portion 800b' can be configured such that a portion of the optimized return signal 802b is inverted with respect to the original return signal 802a. Notably, the optimized return signal 802b exhibits improved damping as compared to the original return signal 802a because the additional portion 800b' actively suppresses ringdown. As a result, as time increases, the amplitude of the optimized return signal 802b decreases more rapidly than the original return signal 802a. Thus, use of the modified ultrasonic signal 800b, as compared to the original ultrasonic signal 800a, can provide significant suppression of ringdown of return signals resulting from reflection of incident signals at the surface of the target 104 and improved resolution when characterizing near sub-surface defects.

EXAMPLE 5

Ultrasonic Signal Modulation for Deep Penetration

Figures 9A, 9B, 9C:
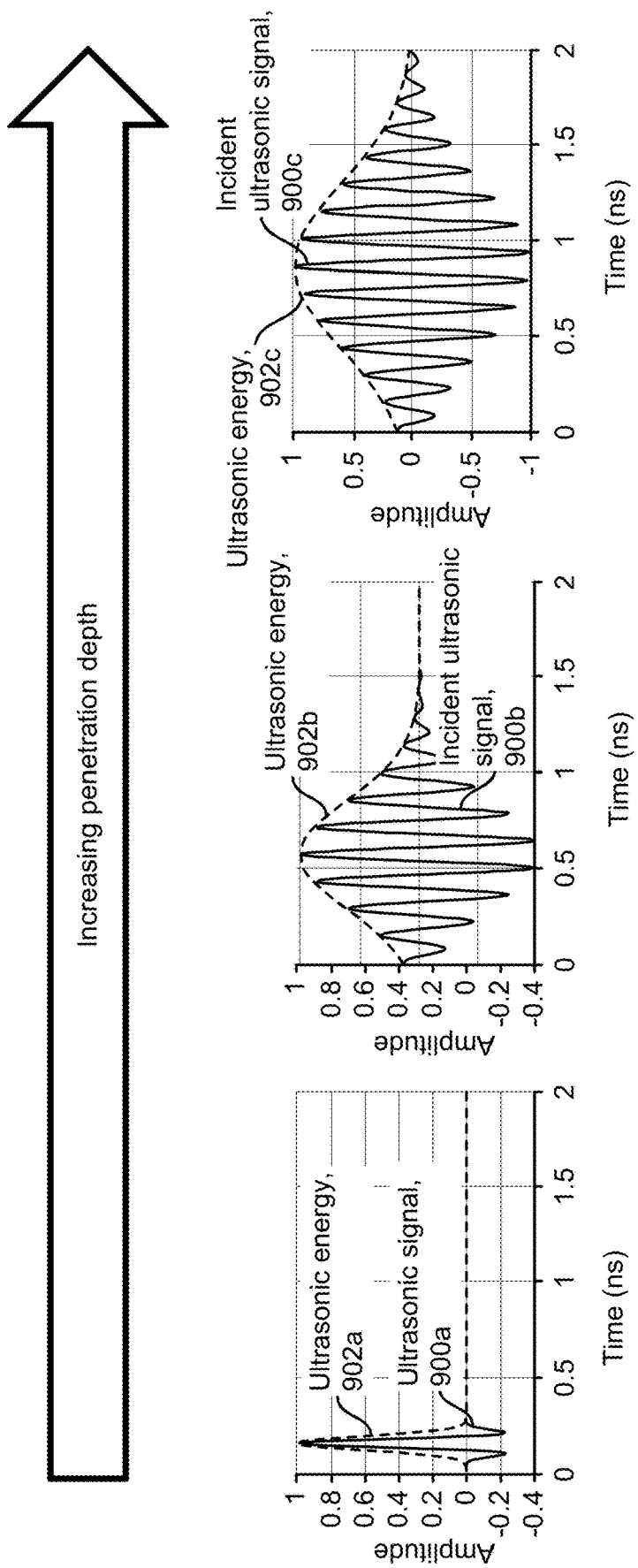
FIGS. 9A-9C are plots illustrating a further exemplary embodiment of waveforms generated by the ultrasonic testing system of FIG. 1 that provide improved penetration into the target.

As discussed above in Example 3, the use of a relatively "sharp" ultrasonic signals having a relatively short duration (e.g., low number of cycles) can facilitate improved imaging of near sub-surface defects. An example of such a sharp ultrasonic signal 900a is reproduced in FIG. 9A. In general, this concept can be extended to facilitate deep penetration. That is, in one aspect, increasing the number of cycles of the ultrasonic signal increases the duration and thus the penetration depth of the ultrasonic signal. Examples are illustrated in FIGS. 9B-9C.

In another aspect, the selected center frequency can also influence the penetration depth. As discussed above, the optimized center frequency range that minimizes attenuation depends on both the material of the target 104 and the properties of the reflector. Thus, the ability of the ultrasonic testing system 102 to vary the center frequency allows ultrasonic testing to be performed within the range of optimized center frequencies that minimizes attenuation for any target 104 and any reflector, increasing depth of penetration.

EXAMPLE 5

Ultrasonic Signal Modulation for Shallow and Deep Penetration

As discussed above with regards to FIG. 6, the center frequency of a continuous ultrasonic signal 112s can be varied during testing. As an example, the center frequency can be decreased over time to vary the depth of penetration from relatively deep to relatively shallow. Alternatively, the center frequency can be increased over time to vary the depth of penetration from relatively shallow to relatively deep. Combining a change of center frequency with a large number of cycles facilitates deep penetration.

In alternative embodiments, sequences of burst ultrasonic signals having the same or different center frequencies can be employed. In certain embodiments, these ultrasonic signals can be modulated to a carrier signal. Examples of carrier signals can include, but are not limited to, rectangular pulses and Barker code.

EXAMPLE 5

Ultrasonic Signal Modulation for High Throughput Testing

In general, it is desirable for ultrasonic tests to be performed quickly in order to provide high throughput. However, existing ultrasonic testing systems can require a time delay between emission of ultrasonic pulses to avoid overlap of return signals 114s (e.g., cross-talk). These time delays can limit throughput of these existing ultrasonic testing systems.

The ability of the ultrasonic testing system 102 discussed herein to adjust the center frequency of ultrasonic signals 112s can avoid such throughput limitation. As an example, ultrasonic signals 112s that are temporally adjacent to one another can have different center frequencies. The change of center frequency can be identified in the resultant return ultrasonic signals 112s, allowing the return signals 114s to be filtered based upon center frequency. Thus, each return ultrasonic signal 114s can be correlated to its ultrasonic signal 112s. With this filtering ability, cross-talk can be avoided, facilitating an increase in the rate at which ultrasonic signals 112s are fired and attendant increase in throughput of ultrasonic testing.

Figure 10:
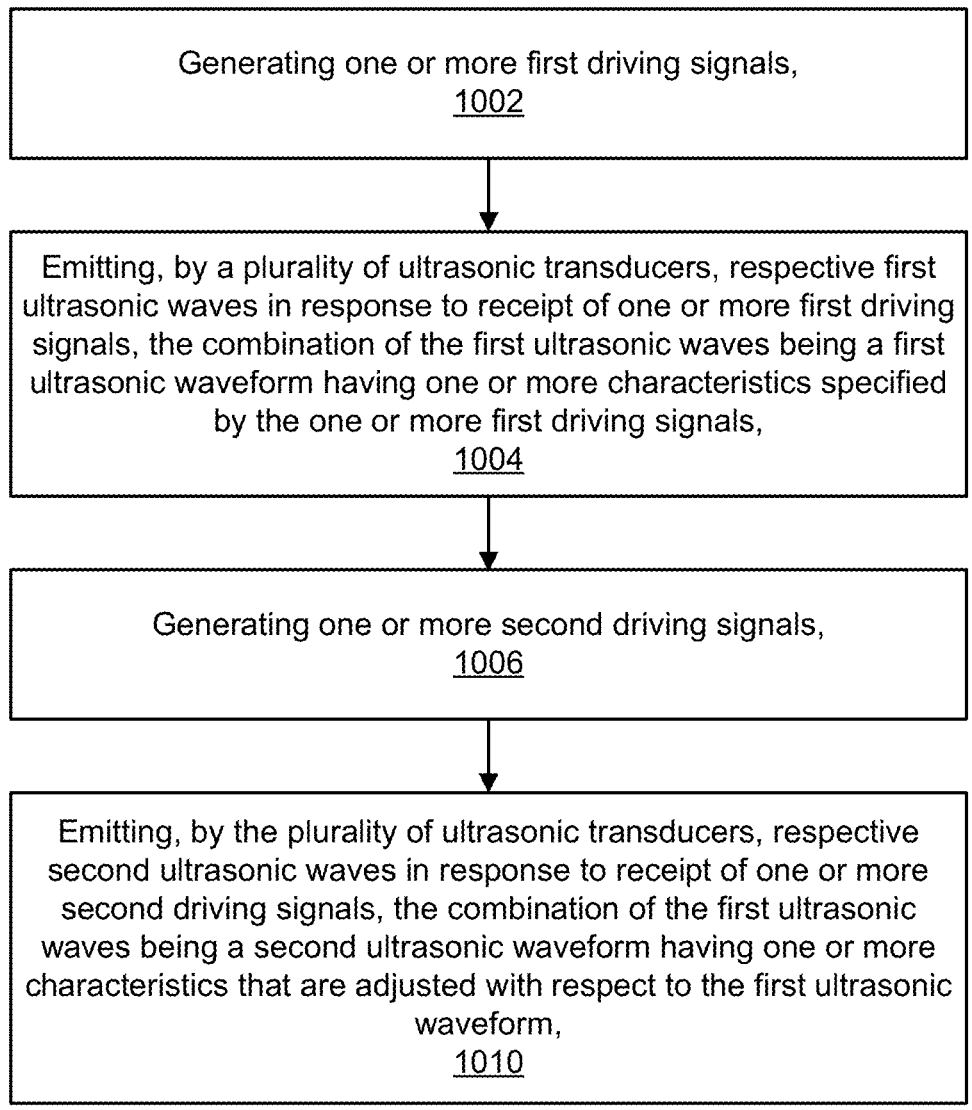
FIG. 10 is a flow diagram illustrating one embodiment of a method of non-destructive testing performed by the ultrasonic testing system of FIG. 1.

FIG. 10 is a flow diagram illustrating one embodiment of a method 1000 for performing ultrasonic testing employing the ultrasonic testing system of FIG. 1. As shown, the method 1000 includes operations 1002-1010. However, it can be understood that alternative embodiments of the method can omit one or more of these operations and the operations can be performed in a different order than shown in FIG. 10.

In operation 1002, one or more first driving signals can be generated by the ultrasonic controller 110 (e.g., analog excitation signals 204a). As an example, the first driving signals can be based upon command signals 116s received from the user computing device 116.

In operation 1004, respective first ultrasonic waves (e.g., ultrasonic signals 112s) can be generated by a plurality of ultrasonic transducers (e.g., ultrasonic transducers 112) in response to receipt of the first driving signals. The combination of the first ultrasonic waves can be a first ultrasonic waveform having one or more characteristics (e.g., amplitude, frequency, duration, etc.) specified by the first driving signals.

In operation 1006, one or more second driving signals can be generated by the ultrasonic controller 110 (e.g., analog excitation signals 204a). As an example, the second driving signals can be based upon further command signals 116s received from the user computing device 116 that are different from the command signals employed to generate the first driving signals.

In operation 1010, the plurality of ultrasonic transducers can emit respective second ultrasonic waves in response to receipt of the one or more second driving signals. The combination of the second ultrasonic waves can be a second ultrasonic waveform having at least one characteristic that is adjusted with respect to the first ultrasonic waveform.

Exemplary technical effects of the methods, systems, and devices described herein include, by way of non-limiting example, ultrasonic testing systems and corresponding methods that provide a universal, high bandwidth ultrasonic probe. The ultrasonic probe can be driven by electronics that allow precise modulation of emitted ultrasonic waves (e.g., frequency, waveform, duration, etc.), facilitating penetration of ultrasonic waves into a test material, including those that are strongly attenuating. These ultrasonic probes can be tailored to specific applications and avoids the need for multiple types of ultrasonic probes. This provides cost savings and simplified setup due to a reduced number of ultrasonic probe types. The ability of the disclosed ultrasonic testing systems to tailor the generated ultrasonic waveforms on-site also provides, in one aspect, risk minimization, as the likelihood of conducting ultrasonic testing using unsuitable or non-optimized ultrasonic waveforms is significantly reduced. The ability of the disclosed ultrasonic testing systems to tailor the generated ultrasonic waveforms on-site (e.g., beam shaping) further provides, in another aspect, an extension of the range of potential testing applications. The ability of the disclosed ultrasonic testing systems to tailor the generated ultrasonic waveforms on-site (e.g., beam shaping) further provides, in an additional aspect, the ability to operate in a spectroscopy mode where the ultrasonic test frequency is varied for characterization of the test material.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A system, comprising:
an ultrasonic probe including a plurality of ultrasonic transducers; and
an ultrasonic controller including one or more processors in electrical communication with the ultrasonic probe, the ultrasonic controller being configured to generate one or more driving signals operative to cause the plurality of ultrasonic transducers to generate respective ultrasonic waves, the ultrasonic probe and the ultrasonic controller configured to perform operations comprising
generating, by the ultrasonic controller, one or more first driving signals;
emitting, by the plurality of ultrasonic transducers, respective first ultrasonic waves in response to receipt of one or more first driving signals, wherein a combination of the first ultrasonic waves is a first ultrasonic waveform having one or more characteristics specified by the one or more first driving signals;
generating, by the ultrasonic controller, one or more second driving signals;
emitting, by the plurality of ultrasonic transducers, respective second ultrasonic waves in response to receipt of the one or more second driving signals, wherein a combination of the second ultrasonic waves is a second ultrasonic waveform having at least one characteristic that is adjusted with respect to the first ultrasonic waveform, wherein the at least one adjusted characteristic is a center frequency;
selecting the center frequency by emitting, by the plurality of ultrasonic transducers, the first ultrasonic waveform having a first center frequency;
receiving, by the plurality of ultrasonic transducers, a third ultrasonic waveform resulting from reflection of the first ultrasonic waveforms from a target;
measuring, by the ultrasonic controller, an amplitude of the third ultrasonic waveform;
emitting, by the plurality of ultrasonic transducers, the second ultrasonic waveform having a second center frequency;
receiving, by the plurality of ultrasonic transducers, a fourth ultrasonic waveform resulting from reflection of the second ultrasonic waveforms from the target;
measuring, by the ultrasonic controller, an amplitude of the fourth ultrasonic waveform;
selecting, by the ultrasonic controller, the center frequency as first center frequency when the amplitude of the third ultrasonic waveform is greater than the amplitude of the fourth ultrasonic waveform; and
selecting, by the ultrasonic controller, the center frequency as second center frequency when the amplitude of the fourth ultrasonic waveform is greater than the amplitude of the third ultrasonic waveform.

2. The system of claim 1, wherein generating the first and second driving signals causes the first ultrasonic waveform to transition to the second ultrasonic waveform during an ultrasonic inspection.

3. The system of claim 1, wherein the at least one adjusted characteristic comprises at least two characteristics, which comprise the center frequency and an amplitude of the second ultrasonic waveform.

4. The system of claim 1, wherein the at least one adjusted characteristic comprises at least two characteristics, which comprise the center frequency and a time duration of the second ultrasonic waveform.

5. The system of claim 1, wherein the at least one adjusted characteristic comprises at least two characteristics, which comprise the center frequency and a number of cycles of the second ultrasonic waveform.

6. The system of claim 1, wherein the at least one adjusted characteristic comprises at least three characteristics, which comprise the center frequency, an amplitude of the second ultrasonic waveform, and a duration of the second ultrasonic waveform, wherein the amplitude and the duration of the second ultrasonic waveform concurrently differ from an amplitude and a duration of the first ultrasonic waveform.

7. The system of claim 1, wherein the at least one adjusted characteristic comprises three characteristics, which comprises the center frequency, an amplitude of the second ultrasonic waveform, a frequency of the second ultrasonic waveform, wherein the amplitude of the second ultrasonic waveform and an amplitude of the first ultrasonic waveform are approximately the same and the frequency of the second ultrasonic wave form and a frequency of the first ultrasonic waveform differ.

8. A method of non-destructive testing, comprising:
generating, by an ultrasonic controller, one or more first driving signals;
emitting, by a plurality of ultrasonic transducers, respective first ultrasonic waves in response to receipt of one or more first driving signals, wherein a combination of the first ultrasonic waves is a first ultrasonic waveform having one or more characteristics specified by the one or more first driving signals;
generating, by the ultrasonic controller, one or more second driving signals;
emitting, by the plurality of ultrasonic transducers, respective second ultrasonic waves in response to receipt of the one or more second driving signals, wherein a combination of the second ultrasonic waves is a second ultrasonic waveform having at least one characteristic that is adjusted with respect to the first ultrasonic waveform, wherein the at least one adjusted characteristic is a center frequency;
selecting the center frequency by emitting, by the plurality of ultrasonic transducers, the first ultrasonic waveform having a first center frequency;
receiving, by the plurality of ultrasonic transducers, a third ultrasonic waveform resulting from reflection of the first ultrasonic waveforms from a target;
measuring, by the ultrasonic controller, an amplitude of the third ultrasonic waveform;
emitting, by the plurality of ultrasonic transducers, the second ultrasonic waveform having a second center frequency;
receiving, by the plurality of ultrasonic transducers, a fourth ultrasonic waveform resulting from reflection of the second ultrasonic waveforms from the target;

measuring, by the ultrasonic controller, an amplitude of the fourth ultrasonic waveform;

selecting, by the ultrasonic controller, the center frequency as first center frequency when the amplitude of the third ultrasonic waveform is greater than the amplitude of the fourth ultrasonic waveform; and selecting, by the ultrasonic controller, the center frequency as second center frequency when the amplitude of the fourth ultrasonic waveform is greater than the amplitude of the third ultrasonic waveform.

9. The method of claim 8, further comprising generating the first and second driving signals such that the first ultrasonic waveform transitions to the second ultrasonic waveform during an ultrasonic inspection.

10. The method of claim 8, wherein the at least one adjusted characteristic comprises at least two characteristics, which comprise the center frequency and an amplitude of the second ultrasonic waveform.

11. The method of claim 8, wherein the at least one adjusted characteristic comprises at least two characteristics, which comprise the center frequency and a time duration of the second waveform.

12. The method of claim 8, wherein the at least one adjusted characteristic comprises at least three characteristics, which comprise the center frequency, an amplitude of the second ultrasonic waveform, and a duration of the second ultrasonic waveform, wherein the amplitude and the duration of the second ultrasonic waveform concurrently differ from an amplitude and a duration of the first ultrasonic waveform.

13. The method of claim 8, wherein the at least one characteristic comprises at least three characteristics, which comprise the center frequency, an amplitude of the second ultrasonic waveform and a frequency of the second ultrasonic waveform, wherein an amplitude of the first ultrasonic waveform and the amplitude of the second ultrasonic waveforms are approximately the same and a frequency of the first ultrasonic waveform and the frequency of the second ultrasonic waveforms are different.

14. The method of claim 8, further comprising:
receiving, by the plurality of ultrasonic transducers, a third ultrasonic waveform resulting from reflection of the first ultrasonic waveforms from a target; and
generating the one or more second driving signals based upon the third ultrasonic waveform;
wherein at least a portion of the amplitude of the second ultrasonic waveform is reduced as a function of time with respect to the first ultrasonic waveform.

* * * * *